United States Patent [19]

Kraus

[11] 3,980,056

[45] Sept. 14, 1976

[54] FUEL INJECTION DEVICE

[76] Inventor: Werner Kraus, Bauerstrasse 31, 8000 Munich 40, Germany

[22] Filed: Dec. 18, 1972

[21] Appl. No.: 315,817

[52] U.S. Cl. ............................ 123/27 A; 123/32 J; 123/33 E; 123/119 A; 123/122 H; 123/180 EH
[51] Int. Cl.² ........................................ F02B 3/00
[58] Field of Search ................. 123/26, 27 R, 27 A, 123/30 D, 33 B, 33 C, 33 E, 122 D, 179 H, 180 EH, 119 A

[56] References Cited
UNITED STATES PATENTS

| | | | |
|---|---|---|---|
| 1,769,675 | 7/1930 | Bruckner | 123/27 A |
| 1,872,931 | 8/1932 | Goldsborough | 123/27 A |
| 2,057,318 | 10/1936 | Schwaiger | 123/32 J |
| 2,855,908 | 10/1958 | Pflaum | 123/32 J |
| 3,498,279 | 3/1970 | Seeley | 123/122 F |
| 3,633,551 | 1/1972 | Jarnoszkiewicz | 123/33 E |
| 3,682,151 | 8/1972 | Tatsutomi | 123/119 A |
| 3,744,251 | 7/1973 | Hallum | 123/119 A |
| 3,787,037 | 1/1974 | Motooka | 123/122 H |
| 3,789,817 | 2/1974 | Morel et al. | 123/180 EH |
| 3,827,412 | 8/1974 | Waltzman | 123/119 A |

FOREIGN PATENTS OR APPLICATIONS

| | | | |
|---|---|---|---|
| 586,269 | 11/1959 | Canada | 123/27 A |
| 617,370 | 3/1961 | Canada | 123/27 A |

*Primary Examiner*—Charles J. Myhre
*Assistant Examiner*—Paul Devinsky
*Attorney, Agent, or Firm*—Edwin E. Greigg

[57] ABSTRACT

The specification describes an injection system with means for supplying a hot gas stream consisting mostly or totally of combustion air. The hot gas supply device comprises a heating device independent from the internal combustion engine served. The hot gas flow is heated to a temperature of at least 150°C and has a mean flow rate of at least one third of the combustion air required by the internal combustion engine during idling. The hot gas flow is supplied to a zone adjacent to the opening of the injector.

16 Claims, 8 Drawing Figures

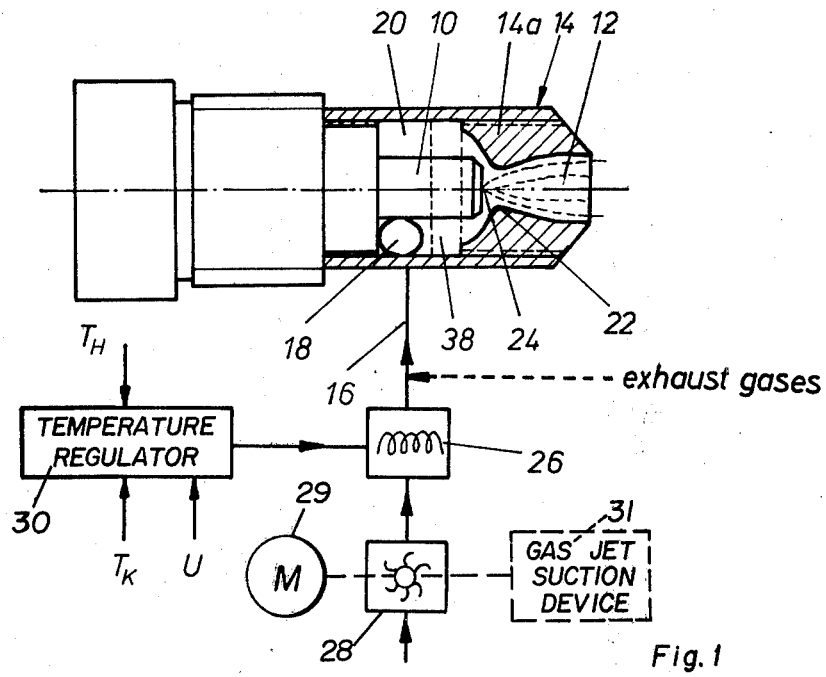
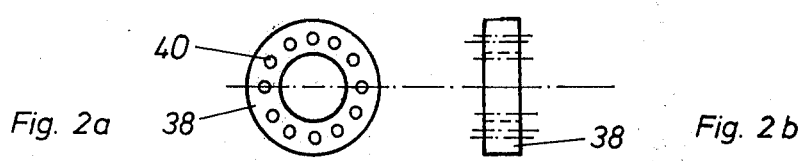
Fig. 2a  Fig. 2b
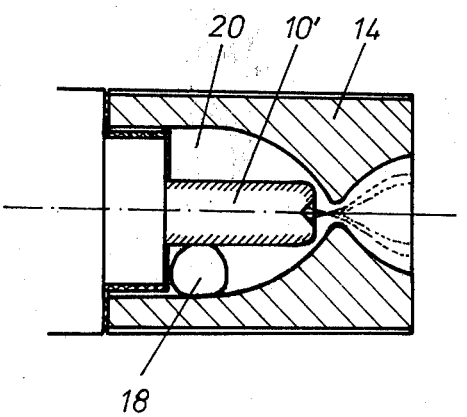
Fig. 3

FUEL INJECTION DEVICE

The present invention relates to fuel injection devices for a reciprocating or rotary piston internal combustion engine with at least one combustion space, an injection nozzle and a device for supplying a preheated hot gas current consisting at least mostly of combustion air.

The problem of reducing fuel consumption of an internal combustion engine driven with a varying load, for example the engine of a motor vehicle and simultaneously keeping the exhaust gases as free as possible of noxious components such as carbon monoxide and nitrogen oxides is one which has long been known and is difficult to solve, since these two requirements are to a certain extent antagonistic.

In order to solve the problem mentioned there has already been a proposal to heat the whole of the combustion air (drawn-in air). This, however, leads to the disadvantage that as a result the degree of filling or charging is reduced and that in the case of a cold engine and during idling, when no waste heat is available, a substantial amount of energy is required for heating the whole inlet system.

In accordance with a further proposal the fuel was to be sprayed onto a hot surface on which it was then evaporated. This notion was found to be satisfactory in the case of certain Diesel engines but can only be used in cases in which high wall temperatures occur. These conditions are not, however, to be found in many cases, for instance rotary piston engines (Wankel engines) — especially during operation when partly loaded. In this case therefore the distribution of the fuel must occur in the air and not be ensured by a heated wall.

It is also known that the above-mentioned problem can be more easily solved in the case of fuel injection (injection into the inlet system or directly into the combustion chamber) than is the case with the use of a carburetor. An injection nozzle supplies a liquid mist of droplets with a certain diameter spectrum. In order to encourage evaporation of the fuel injected by means of a nozzle or injector there has been a previous proposal to heat the injector nozzle, so that a liquid vapour mixture is formed in it. This attempt to tackle the problem has, however, the disadvantage that a compressible medium can be formed in the injector, something which makes it difficult to meter out the fuel for injection.

In accordance with a still further prior porposal the fuel stream injected by means of an injector was to have air blown in around it. Investigations on rotary piston engines (Wankel engine) and Diesel engines have, however, shown that the degree of combustion of the fuel is not improved by this method and is in fact often even reduced.

One aim of the present invention is therefore that of providing a fuel injection device which ensures that the injected fuel is practically completely burned and that the exhaust gases contain very few noxious components.

The present invention consists in a fuel injection device for an internal combustion engine with at least one combustion chamber, which is provided with an injector and a device for introducing a preheated hot gas current consisting at least mostly of combustion air, characterised in that the hot gas supply device comprises a heating device independent from the internal combustion engine and supplies a hot gas current with a mean flow rate of at the most one third of the combustion air required at the idling speed of rotation of the engine, into a zone adjacent to the opening of the injector.

It has in fact been found as a result of detailed investigations concerning the injection operation that in the jet of fuel mist which is injected at a certain distance from the injector opening a recondensation occurs of the fuel which is spontaneously evaporated on injection. This applies especially for direct injection of the fuel into the cold drawn-in air.

Owing to the recondensation the degree of distribution of the fuel is impaired and the combustion becomes more and more incomplete. Owing to the feature which has been indicated above so much heat is supplied to the injected fuel mist jet that the recondensation is prevented and the evaporation of fuel droplets still present may be encouraged. The supplied quantity of hot air is in this respect, however, so slight that there is neither an impairment of the degree of charging or filling nor an unacceptable consumption of energy.

Further developments and forms of the invention are defined in subclaims.

In what follows the invention will be described with reference to specific embodiments in conjunction with the accompanying drawings.

FIG. 1 shows diagrammatically an embodiment of an internal combustion injection device in accordance with the invention.

FIGS. 2a and 2b represent a plan view and a side view respectively of a flow aligning disc which can be used in the nozzle of the device in accordance with FIG. 1.

FIGS. 3 to 7 show various embodiments of nozzles for a fuel injection device in accordance with the invention.

Figure 4:
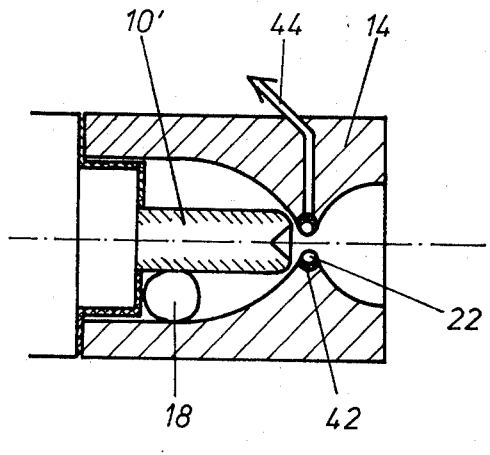

In the figures only those parts essential for understanding the invention are shown and the other parts not shown of the associated internal combustion engine can be constructed in a conventional manner.

The fuel injection device shown in a highly simplified form in FIG. 1 as an embodiment of the invention comprises a fuel injection nozzle or injector 10, which is constructed in a conventional manner and is connected with a conventional injection system of an internal combustion engine, more particularly a motor vehicle engine (not shown) of the reciprocating piston type. The injection nozzle in operation supplies a fuel mist jet 12 intermittently, which spreads out generally conically.

In the case of the present fuel injection device the nozzle is provided with a casing 14 surrounding it, into which a hot gas supply duct 16 opens. In the case of the embodiment of the invention shown the hot gas flows out of the opening 18 of the duct 16 tangentially into the annular space surrounding the nozzle 10 so that a vortex-like flow of hot gas results. The cross-section of the chamber 20 formed by the casing 14 decreases as far as a restriction 22 and then broadens out again so that the arrangement corresponds generally to a Venturi nozzle. The restriction 22 is some distance upstream from the opening 24 of the nozzle. The arrangement is so dimensioned that the liquid droplets in the fuel mist jet 12 cannot make contact with the wall of the casing 14.

The end of the duct 16 remote from the nozzle is connected via a heating device 26 with a blower 28, which forces air from the atmosphere to the heating device 26 and the duct 16 into the chamber 20. The heating device 26 can be in the form of an electrical resistance heating device supplied from the electrical supply system of the vehicle and also the blower 28 can be a blower which is driven by an electric motor 29 connected with the electric supply of the vehicle. Instead of an electric motor 29 it is, however, possible to use a gas jet suction device 31, shown in dashed lines in FIG. 1, which is driven with the engine exhaust gas.

The temperature of the hot gas in the chamber 20 lies preferably above 150°C. Preferably the temperature additionally lies below the ignition temperature of the fuel, that is to say below approximately 450°C. It is, however, also possible to heat the hot gas to such an extent that the fuel is ignited on injection.

The quantity of hot gas supplied is comparatively small in relation to the requirement for combustion air in the case of the internal combustion engine concerned. It amounts at the most to one third and preferably at the most one quarter of the combustion air required during idling so that the degree of charging of the combustion space or chamber with combustion air is not impaired to a disturbing extent. In the case of injection quantities of up to approximately 50 cubic millimeters per stroke a quantity of hot air of approximately 300 to 500 cubic centimeters per second are sufficient.

It is important that the hot gas acts on the fuel mist shortly after the latter has emerged from the injector opening. An intimate mixing of the fuel mist with the hot gas is therefore to take place in a zone which is up to 10 millimeters or at the most up to 20 millimeters in front of the nozzle opening. This prevents recondensation of the fuel which spontaneously evaporates on emerging from the nozzle opening and ensures a substantial and homogeneous mixture formation.

The hot gas can comprise, in addition to the atmospheric air drawn in by the blower 28, a certain amount of exhaust gas and other additions, such as hydrogen and/or trace elements, which act as combustion catalysts. Such additions are known as such, but in the case of the present fuel injection device a particularly satisfactory homogeneous action of these parts of the mixture is attained.

The mixing in of exhaust gas has the advantage that the proportion of noxious products of combustion in the exhaust gas is reduced and the quantity of heat to be supplied by the heating device 26 is reduced. This is especially so in the case of rotary piston engines (Wankel engines), in the case of which very high exhaust gas temperatures occur so that there is a substantial relief of the heating device.

The hot gas can be supplied continuously or intermittently in time with the injection. Intermittent supply of the hot air can be easily ensured, especially in the case of the use of a jet sucking device which is fed by the exhaust gas. In this case the length of the flow paths between the exhaust gas outlet of the combustion space and the opening 18 of the hot gas duct 16 is so dimensioned that the hot gas pulse or surge occurs simultaneously with the fuel injection or somewhat before the instant of fuel injection. It is also possible to draw in the hot air during the inlet or draw-in phase.

The temperature and/or the flow rate of the hot gas can be regulated. It would appear that the most convenient regulation is a regulation of the temperature with a constant flow rate, since such a regulation is the simplest one to provide, especially if use is made of an electrically operated heating device 26.

Regulation of temperature of the hot gas by means of an electrically operated heating device 26 is represented in FIG. 1 diagrammatically. The regulation is carried out by means of a regulator 30 controlling the supply of energy to the heating device 26 and which can be constructed in a conventional manner such as described on pages 133, 135, and 215 of the General Electric Company SCR Manual, third edition, 1964. The regulator receives as input quantities the signal $T_H$ corresponding to the temperature of the hot gas, a signal $T_K$ corresponding to the oil or cooling water temperature, and a signal U corresponding to the speed of rotation of the engine.

Figure 8:
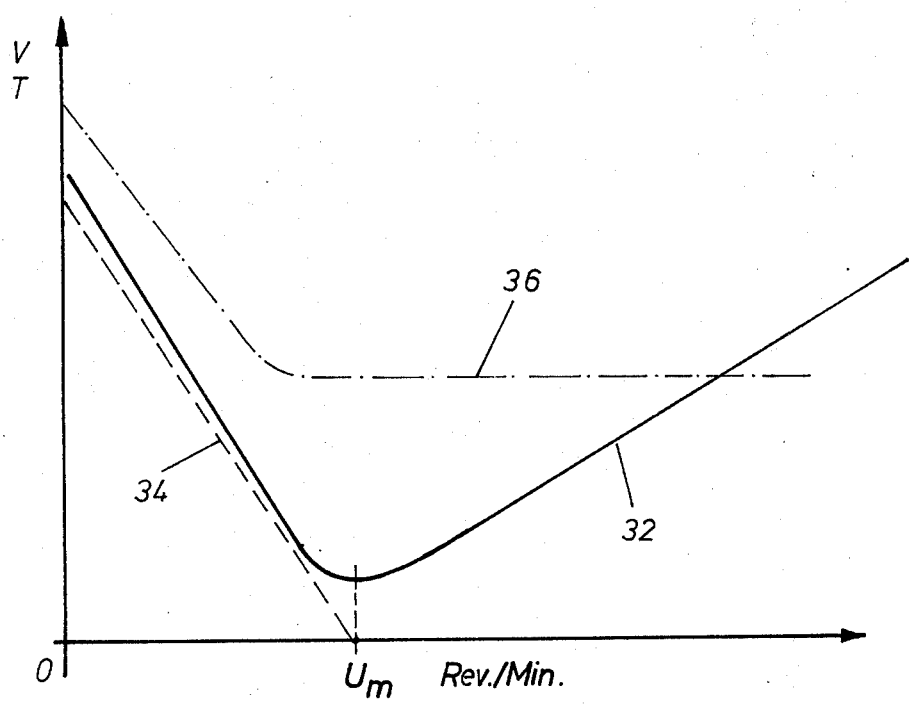
FIG. 8 shows a speed of rotation/fuel consumption graph for a rotary piston engine (Wankel engine), to which reference will be made during the explanation of the invention.

The manner of operation of the regulator will be described taking a rotary piston engine (Wankel engine) as an example with reference to FIG. 8. FIG. 8 shows in a curve 32 the relationship between the fuel consumption V represented on the vertical axis in arbitary units on the speed or rotation of the engine represented along the horizontal axis. In the present state of technology the fuel consumption at a speed of rotation $U_m$ of for example 2000 rpm. assumes a minimum value and then increases both in the case of values higher or lower than the speed of rotation. The increase in the consumption of fuel with an increase in speed of rotation is normal, while the relatively high increase in fuel consumption with a decrease in speed of rotation is a typical feature of present day rotary piston engines and is apparently due to incomplete evaporation of the fuel injected.

The regulator 30 now regulates the hot gas temperature in such a manner that it has comparatively low value at the speed of rotation $U_m$ or even corresponds to the ambient temperature (that is to say the heating device 26 is switched off) and that the temperature increases with a decrease in speed of rotation, as is indicated diagrammatically by the characteristic 34 in broken lines. If the regulation is additionally to be made dependent on the oil or cooling water temperature, the regulation is preferably so arranged that it regulates in accordance with the characteristic 34, when the engine has warmed up, while in the case of the engine when still cold occurs for example in accordance with the dot-dash line or characteristic 36, that is to say so that in this case the hot gas temperature reduces in the case of the speed of rotation starting at zero as far as a certain speed or rotation which is equal to or greater than the speed of rotation at idling, and then remains substantially constant, that is to say dependent on the speed of rotation. With an increase in the oil or cooling water temperature the characteristic 36 then gradually merges with the characteristic 34. The initial temperatures of the characteristics 34 and 36 can be the same or the characteristic 36 can begin at a higher starting temperature.

This type of temperature regulation offers the advantage that a comparatively large amdount of energy is supplied to the fuel mist or when the engine is still cold or is idling, while on an increase in the engine temperature and the speed of rotation the energy requirement is lowered. This leads to a very economic consumption of energy.

In the nozzle casing 14 at the position indicated in broken lines a flow aligning plate 38 can be mounted as shown in FIG. 2. This plate has holes 40 which allow a control of the flow of the hot gas adjacent to the nozzle opening in a desired manner.

An additional possibility of adjustment or regulation can be achieved if the nozzle casing or the inner part 14a (FIG. 1) forming the nozzle channel for the fuel mist is made axially adjustable so that the cross-section of the annular intermediate space between the front end of the injection nozzle 10 and the inner wall of the nozzle casing can be changed and thus the rate of flow of hot air can be controlled or influenced. One method of axially adjusting the inner part 14a of the nozzle channel is illustrated in FIG. 1, wherein the inner surface of the annular outer casing 14 and the outer surface of the inner part 14a both include cooperating screw threads. When the part 14a is rotated in one direction it is screwed further into the casing 14 and moves axially toward the nozzle 10; similarly, when rotated in the opposite direction, it moves axially away from the nozzle 10.

It is also possible to couple the axially movable inner part 14a of the nozzle casing with the throttle flap controlling the rate of flow of combustion air. The arrangement is in this respect preferably so made that the cross-section of the annular inner space between the front end of the injection nozzle 10 and the inner wall of the nozzle casing, that is to say the cross-section of the hot air channel, has its largest value when the throttle flap is closed and in partial loading conditions (that is to say for instance below 2000 rpm.) becomes smaller with an increase in opening of the throttle flap. This type of regulation is particularly advantageous if the hot air is drawn in by the engine and no additional blower is present and/or a blower which is already present is switched off a predetermined interval of time after starting the engine or on achieving a certain temperature of the cooling water or oil, and the normal operation of the engine remains switched off.

In the case of the described adjustment of the cross-section of the hot air channel or duct the throttle flap can close somewhat earlier than usual since during idling and under partial load a substantial part of combustion air is supplied through the hot air duct or channel and the function of the throttle flap is taken over in the case of low rates of air flow partly by the adjustment of the cross-section of the hot air duct.

FIG. 3 shows a nozzle arrangement which in principle corresponds to the nozzle arrangement 10, 14 in FIG. 1. The nozzle 10' is, however, a so-called counter-jet nozzle, which supplies two or more converging fuel jets which meet a short distance from the nozzle and owing to their impact encourage the comminution of the fuel.

FIG. 4 shows a nozzle, whose casing 14 comprises an additional heating device 42 at the restriction 22, and the heating device 42 can for example comprise a resistance wire which is connected with the electrical supply of the vehicle via lines 44.

Figure 5:
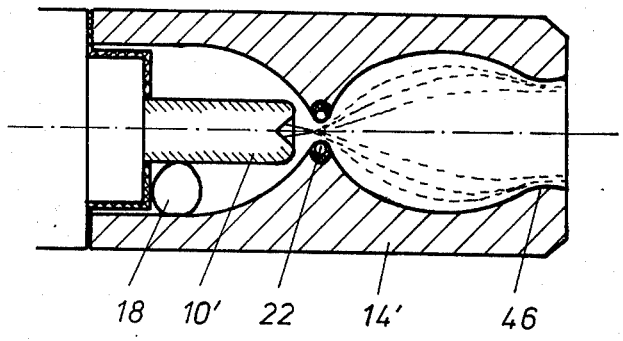

The nozzle arrangement in accordance with FIG. 5 comprises a casing 14' which following the restriction 22 does not broaden out linearly as is the case with previously shown embodiments of the invention, but at a certain distance from the restriction 22 has a second restriction 46 which is preferably somewhat broader than the restriction 22. Owing to such a shape vibrations, which may occur in the fuel mist jet under certain conditions, are avoided as far as possible.

Figure 6:
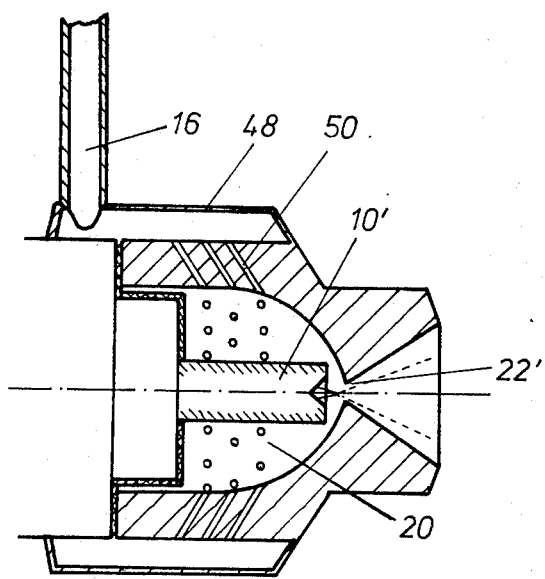

FIG. 6 shows a nozzle arrangement in the case of which the hot gas duct 16 ends in an outer casing 48, which is connected by a number of holes with the chamber 20. The holes can run radially or, as shown, somewhat in the axial direction. In both cases the holes can also have a tangential slope in order to give the blown-in hot air an azimuthal component of movement. The inner wall of the chamber 20 extends as far as the restriction 22 in a curved manner, for example parabolically and then conically following the tapered part.

The curved part and the conical part of the inner wall of the casing meet at a sharp edge 22'. Owing to this a zone of strong turbulence is produced in a hot gas flow immediately upstream from the nozzle opening. This turbulence ensures a very thorough mixing and heat transfer.

Figure 7:
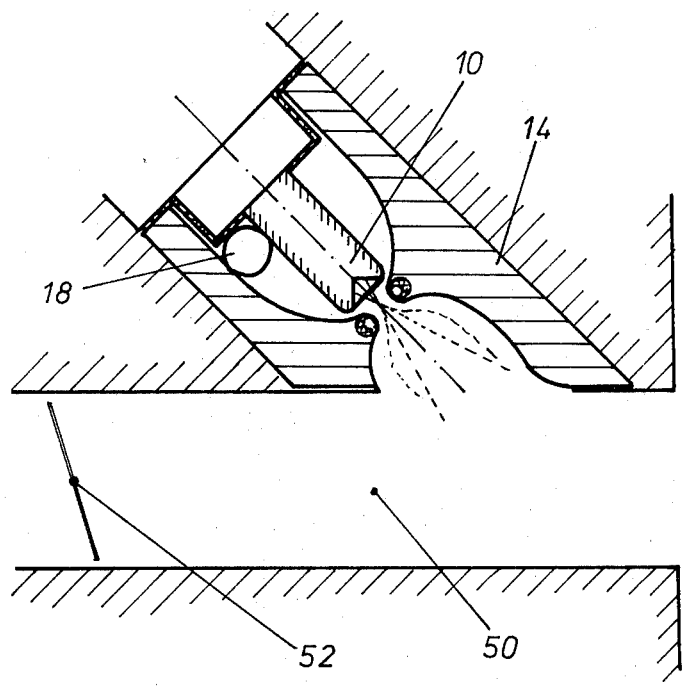

FIG. 7 shows the arrangement of a nozzle 10 with a casing 14 and hot gas supply opening 18 in conjunction with an inlet tube 50, which comprises a throttle flap 52.

A preferred field of application for the present invention is constituted by rotary piston engines, and more particularly Wankel engines. The invention can, however, be applied to other internal combustion engines, more particularly reciprocating piston engines including both those operated with carburettor fuels and also those operated with Diesel fuel.

In the present text the expression "rotary piston engine" is to be taken to mean all piston engines which are substantially non-reciprocating.

What I claim is:

1. A fuel injection system for an internal combustion engine which has at least one combustion chamber and a given combustion air requirement at idling speed comprising a fuel injection device including;
   a fuel injector ;
   an annular means for forming a chamber having an inner wall and surrounding said injector, with said injector having an opening for injecting a fuel mist jet into a zone of the chamber adjacent said opening, with a part of said wall extending in the direction of the fuel mist jet emerging from said opening of said injector in an axial direction beyond said opening, thereby defining said zone, and with the inner wall of said extending part of said annular means being shaped so that it is not reached by fuel droplets of the fuel mist jet; and
   a hot gas supply means connected to said chamber including a heating device independent of the internal combustion engine for supplying a hot gas current into said chamber downstream of said zone adjacent to said opening in said injector for passage through said zone at a mean flow rate of at most one-third of the given combustion air requirement at idling speed.

2. A system in accordance with claim 1, wherein said hot gas supply means is a supply means for effecting at most 15% of the quantity of combustion air needed for idling.

3. A system in accordance with claim 1 wherein said hot gas supply means is a supply mean for effecting transfer of heat from the hot gas current to fuel mist emerging from said opening in said injector within a zone of 20 millimeters in front of said opening.

4. A system in accordance with claim 1, wherein said inner wall of said extending part of said annular means as seen in the direction of flow of the fuel mist jet has a diameter which firstly decreases as far as a restriction and then increases again.

5. A system in accordance with claim 4, wherein said inner wall of said extending part of said annular means has at least approximately the form of a Venturi nozzle.

6. A system in accordance with claim 4, wherein said restriction is provided with an additional heating device.

7. A system in accordance with claim 1, wherein said heating device independent of the internal combustion engine comprises an electrical heating device.

8. A system in accordance with claim 1, wherein said hot gas supply means comprises an electrically operated blower.

9. A system in accordance with claim 1, wherein said hot gas supply means comprises a blower operated with exhaust gases of the internal combustion engine, of the gas flow suction type.

10. A system in accordance with claim 1, wherein said hot gas supply means is a supply means for effecting hot gas rate of flow, which amounts to at most 25% of the quantity of combustion air needed for idling.

11. A system in accordance with claim 4, wherein said annular means comprises an outer annular casing having a screw threaded inner surface, and a movable inner part, which includes said restriction, and which has a screw threaded outer surface, designed to cooperate with said threaded inner surface, whereby said inner part can be adjusted axially in relation to said injector by rotation within said outer casing.

12. A system in accordance with claim 1, further comprising temperature regulating means for regulating hot gas temperature in accordance with the operational state of the internal combustion engine.

13. A system in accordance with claim 12, wherein said temperature regulating means is a regulating means which on starting effects a maximum temperature to the hot gas and with increasing heating up of the internal combustion engine effects a decrease in temperature of the hot gas.

14. A system in accordance with claim 12, wherein said temperature regulating means operates to decrease hot gas temperature from a maximum value at zero speed of rotation with an increase of speed of rotation to a minimum value at a speed of rotation which corresponds at least approximately to minimum of fuel consumption.

15. A system in accordance with claim 12, wherein said temperature regulating means (a) effects a first maximum hot gas temperature at zero speed of rotation, which decreases to approximately ambient temperature at the speed of rotation at which minimum fuel consumption occurs, when the engine is hot, and (b) effects a second maximum hot gas temperature at least equal to said first maximum hot gas temperature, at zero speed of rotation, which decreases with an increase in speed of rotation to a temperature, preferably at least 150°C. substantially above ambient temperature and then remains at this value with a further increase in the speed of rotation when the engine is cold.

16. A system in accordance with claim 1, further comprising means for adding and mixing in exhaust gases to said hot gas current.

* * * * *